United States Patent [19]

Clearwaters et al.

[11] 4,203,162

[45] May 13, 1980

[54] ELECTRICALLY STEERABLE SPHERICAL HYDROPHONE ARRAY

[75] Inventors: Walter L. Clearwaters, Quaker Hill; Lloyd T. Einstein, New London; Paul F. Radics, Jr., Oakdale; John W. Soderberg, Niantic, all of Conn.

[73] Assignee: The United States of America as represented by the Secretary of the Navy, Washington, D.C.

[21] Appl. No.: 360,181

[22] Filed: Apr. 10, 1964

[51] Int. Cl.[2] .................... G01S 3/80

[52] U.S. Cl. .................... 367/122; 367/105; 367/138; 367/153; 367/123

[58] Field of Search .................... 200/5-9, 200/24-26, 164; 340/6, 16; 367/103, 105, 122, 123, 138

[56] References Cited

U.S. PATENT DOCUMENTS

| | | | |
|---|---|---|---|
| 1,863,716 | 6/1932 | Hecht et al. | 340/6 |
| 1,995,708 | 3/1935 | Fischer | 340/6 |
| 2,378,555 | 6/1945 | Jasse | 340/6 |

FOREIGN PATENT DOCUMENTS

| | | | |
|---|---|---|---|
| 566823 | 12/1932 | Fed. Rep. of Germany | 340/16 |

*Primary Examiner*—Richard A. Farley

*Attorney, Agent, or Firm*—Richard S. Sciascia; Arthur A. McGill; Prithvi C. Lall

EXEMPLARY CLAIM

1. Beam forming apparatus for a spherical array of hydrophones comprising:
   - a spherical array of radially inwardly directed wiper contacts,
   - a compensator inside said spherical array of wiper contacts and including insulator means and a series of circular conducting elements having a common axis secured in said insulator means and presenting a smooth spherical surface sector with the conductor elements exposed at the spherical surface, for wiping engagement with the contacts,
   - training means supporting said compensator concentrically within said array of wiper contacts and operable to arcuately displace said compensator about two axes through the center of said array of contacts,
   - signal delay means and signal summing means carried by said training means inside said array of contacts and coupled to the conducting elements for delaying signals from the progressively smaller conductors by progressively longer time periods and for summing the variously delayed signals, and
   - cooperating brush and slip ring means carried by said training means and said array of wiper contacts for delivering the output of said summing means.

2 Claims, 6 Drawing Figures

ELECTRICALLY STEERABLE SPHERICAL HYDROPHONE ARRAY

The invention described herein may be manufactured and used by or for the Government of the United States of America for governmental purposes without the payment of any royalties thereon or therefor.

This invention relates to an electrically steerable hydrophone array and more particularly one having approximately the same beam width and signal sensitivity in all beam directions.

An object of this invention is to provide an underwater listening equipment that has a steerable beam that is highly directional, and has substantially equal sensitivity in all beam directions.

A further object is to provide an underwater listening equipment with a sensing beam that can be steered over a substantial angle vertically, horizontally, or both with approximately the same beam characteristics in substantially all beam directions.

A further object is to provide an underwater listening equipment with a sensing beam that can be steered 360° around an axis with essentially the same characteristics in all beam directions around that axis.

A further object is to provide more accurate, more reliable, and generally superior steerable underwater listening equipment.

Other objects and advantages will appear from the following description of an example of the invention, and the novel features will be particularly pointed out in the appended claims.

Figure 1:
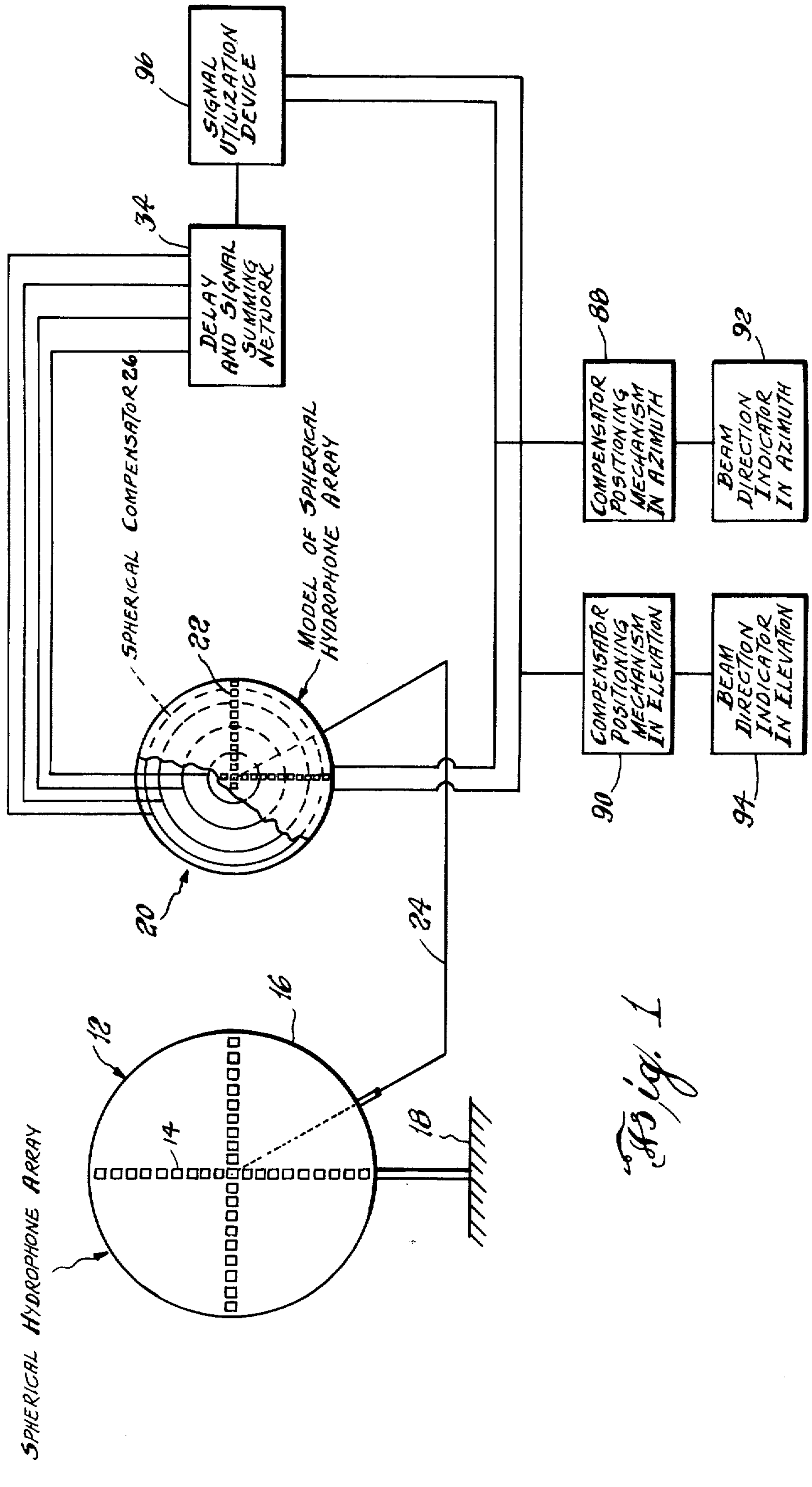
Figure 2:
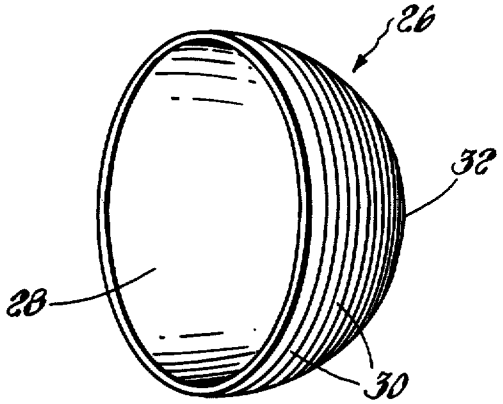
Figure 4:
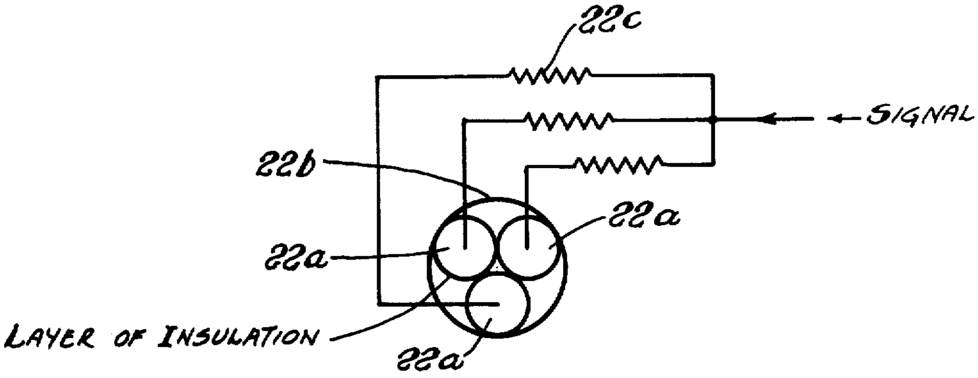
Figure 3:
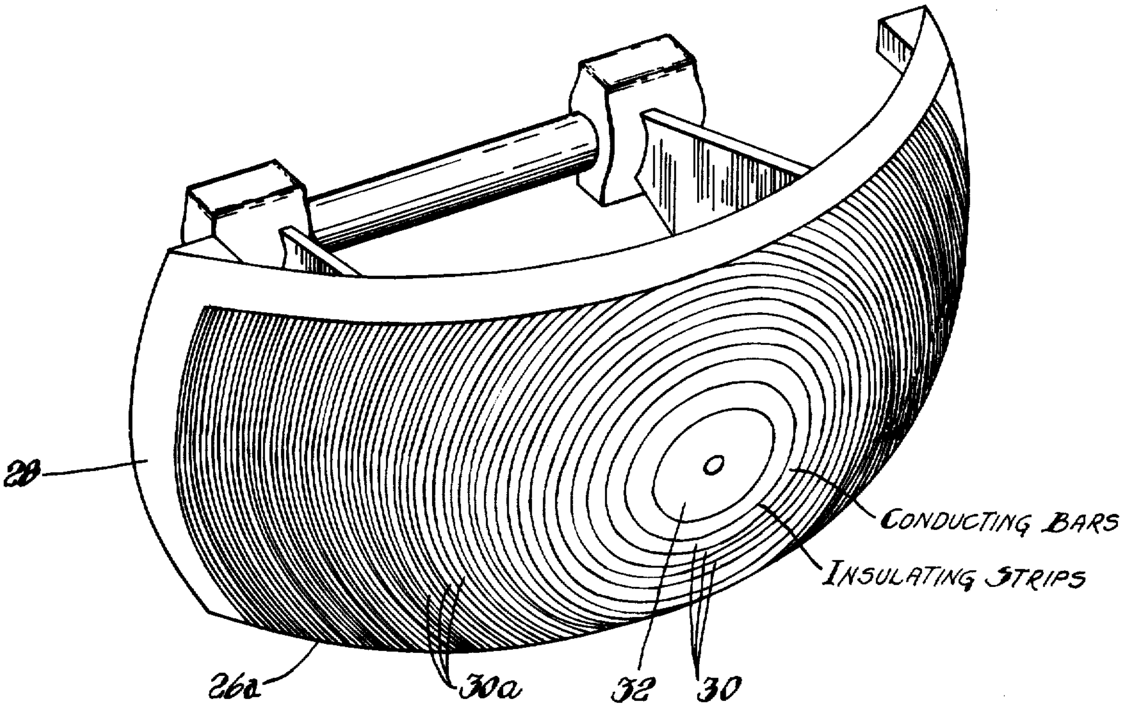
Figure 6:
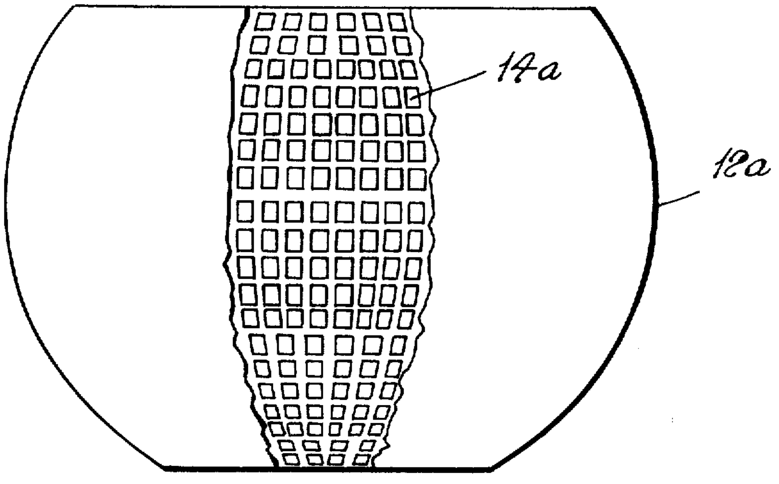
Figure 5:
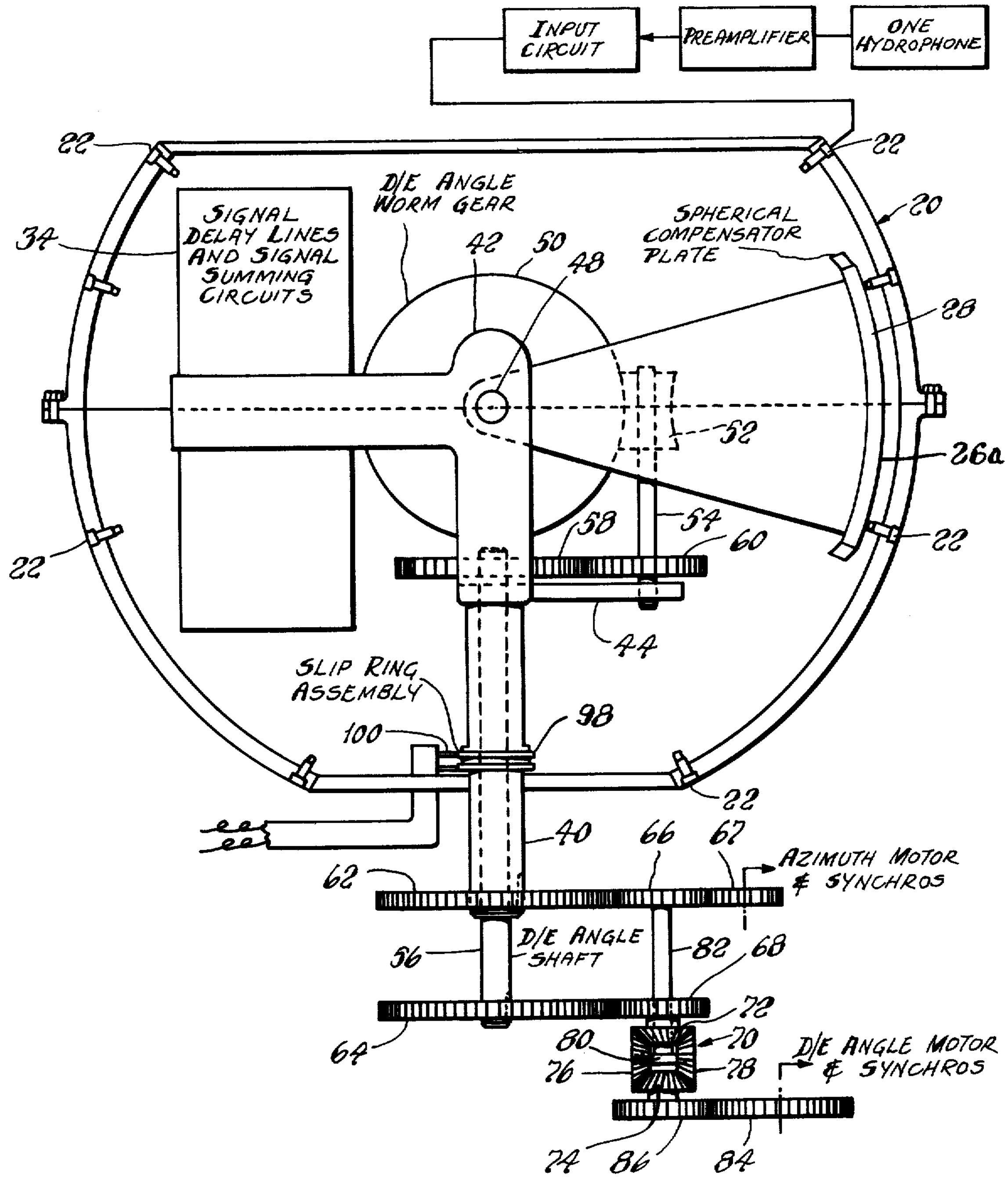

FIG. 1 is a schematic diagram of an embodiment of an electrically steerable underwater listening equipment in accordance with this invention, FIGS. 2 and 3 are alternative forms of compensator devices for use in the system of FIG. 1, FIG. 4 is a schematic view of one type of brush contact for use in the spherical compensator assembly, FIG. 5 is a side view of the compensator positioning mechanism including parts in outline, and FIG. 6 illustrates a spherical hydrophone array wherein the hydrophones are arranged in parallel rings.

In its broader aspects, this invention concerns the combination of a spherical array of hydrophones and apparatus for selecting a group of the hydrophones to form a sensing beam and for adjusting the time relationship of signals sensed by the group of hydrophones to compensate for differences in time of arrival of an acoustic wavefront at the hydrophones in the beam forming group. The term spherical is not limited to a full sphere, it includes a hemisphere, truncated sphere, sector or segment of a sphere and in general any geometrical subdivision of a sphere. The hydrophones are essentially identical and may be any of various compact hydrophones known in the art. They are fixedly mounted on a rigid spherical framework formed from rods, cast sections, machined sections, etc. bolted, welded or otherwise assembled. The hydrophones have essentially identical orientation relative to the spherical center. The array includes a large number of hydrophones and the radius of the array is on the order of one to several yards. Though not essential to the invention, it is preferable that the hydrophones be directional, with a relatively narrow beam. If the hydrophones are non-directional or have a very wide angle of response, each may be mounted in acoustic shields that leave exposed a radially outwardly directed portion of each hydrophone.

The invention includes a comparatively small scale model of the hydrophone array with one brush contact for each hydrophone in the array. The model is joined by a cable to the hydrophone array. The brush contacts are radially oriented and have the same geometric distribution relative to one another as the corresponding hydrophones and are coupled through the cable to the corresponding hydrophones. Preamplifiers, filters, matching circuits and other signal coupling elements may be included between the hydrophones and brush contacts; since these elements are routine design expedients they are not described herein. A spherical compensator is mounted for wiping engagement with the brush contacts. The term compensator in this case describes a set of wiper conductors which function to select a beam forming group of hydrophones and contribute toward compensating for differences in time of sensing a signal by the hydrophones in the group. The compensator includes a matrix of insulating material and a series of circular and/or arcuate bridging elements having a common axis that extends through the spherical center of the compensator and recessed into and forming part of the wiping surface of the compensator that engages the brush contacts. A delay line with a number of inputs or separate delay circuits is connected to the compensator conductor elements to compensate for the difference in time of arrival of an acoustic wavefront at the hydrophones in circuit with the compensator conductor elements, presuming the direction of the wavefront through the hydrophone array corresponds to the beam direction of the compensator selected beam. The delay compensated signals are summed for presentation to a recorder, audio device, oscilloscope or the like conventional in sonar.

The embodiment of the invention shown in FIG. 1 includes a spherical hydrophone array 12 having a substantial number, e.g., several hundred to several thousand, essentially identical hydrophones 14 mounted close together on a rigid free flooding framework 16 fixedly secured to a ship or to the sea bottom shown symbolically at 18. The outside diameter of the spherical array is a matter of design; diameter on the order of several yards is satisfactory. The hydrophones 14 have dimensions appropriate to the size of the array and the number of hydrophones in the array. The hydrophones are substantially uniformly distributed and identically oriented relative to the center of the array in that they have the same sensing portion directed outwardly. Furthermore, the orientation of the hydrophones at every position corresponds to the orientation of any of the hydrophones displaced arcuately downward or arcuately upward about the center of the array or displaced arcuately about a vertical axis through the center of the array.

It is advantageous but not essential to select hydrophones having narrow sensing beam angles. A device of the type described in U.S. patent application Ser. No. 56,611, filed Sept. 16, 1960 by Edwin J. Parssinen et al. and assigned to the U.S. Government is one example of a unit suitable for the array described but others described in the patent literature may be used.

A highly directional beam is obtained by combining the signals from a contiguous group of the hydrophones corrected for spacing along the beam direction. An acoustic wavefront intercepted by the array progresses through the array at a rate on the order of 5000 feet per second. Due to the non-planar geometry a wavefront will not be sensed simultaneously by all the hydrophones of a beam forming group but will be sensed progressively by hydrophones of the group spaced along the direction of the wavefront.

To select a beam forming group of hydrophones in the array, the disclosed embodiment is provided with a spherical assemblage 20 of radial brush contacts 22 on a rigid framework, the number of contacts are equal to the number of hydrophones. A signal coupling means 24 is shown linking one hydrophone and one brush contact. Every hydrophone is correspondingly linked to respective brush contacts. Preamplifiers, filters, matching elements and the like well known in the art are not shown. The brush contacts are oriented with their wiper surfaces directed radially inward. The brush contacts are distributed relative to one another identically to the corresponding hydrophones.

A spherical compensator 26 having a smooth convex wiping surface is supported inside the framework mounting the assemblage of brush contacts with its convex surface in wiping engagement with the brush contacts as shown more clearly in FIG. 5. The compensator shown in two geometric forms 26 and 26*a* in FIGS. 2 and 3 respectively includes a matrix 28 of insulating material in which is embedded a graduated set of circular conductors 30 electrically separate from one another. All but the center compensator conductor are in the form of tapered rings; the center conductor 32 is in the shape of a convex disk. The dimensions of all the compensator conductors projected to the commutator axis are equal and correspond to equal time intervals. The spacings between successive commutator conductors measured on the spherical surface of the commutator are essentially equal and somewhat smaller than the largest dimension of the wiping face of the brush contacts so that each brush contact engages at least one and no more than two circular conductors.

The geometry of the compensator is designed to select the distribution of hydrophones that provides the beam pattern desired. The compensator in FIG. 2 provides a beam pattern that is approximately conical while the compensator in FIG. 3 provides a beam pattern that is wider in one dimension than the other. The latter includes opposed arcuate conductors 30*a* in addition to the circular conductors 30. The beam patterns in all beam directions are substantially identical. The number of conductors in the compensator depends upon the desired degree of accuracy in the correction for differences in time of arrival of a wavefront at the hydrophones of the beam forming group. The dimensions of the circular conductors projected to the axis and measured along the axis of the comparator are equal and represent equal divisions of the time required for a wavefront to progress through the beam forming of hydrophones.

In order to minimize commutation difficulties that may be caused by compensator brush contacts shorting a series of adjacent compensator bars, the brush contacts 22 may be constructed as shown in FIG. 4 in three identical brush parts 22*a* of circular cross-section, in parallel and contiguous. The diameter of each part 22*a* is less than the spacing between compensator conductors. The axes of the three parts of each brush contact are equidistant from the axis of the brush contact. Each part is insulated from the other by a thin layer of insulation, on the order of several thousandths of an inch thickness. The three parts of each brush contact are held together by a jacket 22*b*. A resistor 22*c* is connected in series with each brush part. Where a brush contact engages two adjacent commutator conductors, the bridging patch includes two resistors 22*c* in series. The impedance to the signal where the brush contact engages one bar is one-third the impedance of one resistor 22*c*.

An example illustrating one form that the positioning mechanism for the spherical compensator might take is shown in FIG. 5 and includes a hollow azimuth shaft 40 the axis of which intersects the center of the brush contact assemblage 20. The shaft 40 carries a yoke 42 and a gear support 44. A depression elevation axle 48 is rotatably mounted in the yoke. The axis of axle 48 is normal to the axis of shaft 40 and intersects the center of the brush contact assemblage. The spherical compensator 26*a* is supported by the axle 48 concentric with the assemblage of brush contacts for wiping engagement with the brush contacts 22. A worm gearm 50 is secured to axle 48 and a worm 52 in meshing engagement therewith is carried by a shaft 54 rotatably mounted in support 44. A shaft 56 extends coaxially through shaft 40 and is rotatable relative to shaft 40. Bearings and conventional devices for locking the shafts against longitudinal displacement are omitted. Shaft 56 carries at its upper end a gear 58 that meshes with a gear 60 secured on worm shaft 54. Mechanism for selectively rotating shaft 40 and 56 independently of one another includes gears 62 and 64 secured on shafts 40 and 56 in meshing engagement with gears 66 and 68, respectively, coupled to a differential unit 70. The differential unit 70 includes opposed bevel gears 72 and 74 and opposed bevel gears 76 and 78; the latter two being linked by a shaft 80 relative to which both of the latter are rotatable. The gear 66 and shaft 80 of the differential unit are joined by a pin 82. Gears 68 and 72 are joined for rotation together and are rotatable relative to pin 82. The elevation shaft 56 is rotatable independently of azimuth shaft 40 by a gear 84 in meshing engagement with gear 86, the latter being secured to gear 74 of the differential unit. Independent azimuth and depression elevation position mechanisms 88 and 90 shown in FIG. 1 and which may be manual devices or motor and synchros units as indicated in FIG. 5 drive the gears 67 and 84. Dials or other beam direction indicators 92 and 94 are coupled to the respective azimuth and elevation mechanisms. The latter also are coupled mechanially or by synchros to the signal utilization device 96.

The wiring connections between the circular conductors of the compensator plate and the respective delay lines or delay line inputs are omitted from FIG. 5. Likewise, the wiring connections between the output of the delay lines and signal summing circuits 34 and the slip ring assembly 98 carried by shaft 40 are omitted. Fixedly mounted brushes 100 engage the slip rings and couple the signal to signal utilization device 96.

Since the signal output is optimum when the sensing beam is directed to the acoustic source, the direction of a source may be readily determined by training the compensator.

In FIG. 5, the compensator is adjustable in both elevation and azimuth. This invention can be practised with apparatus wherein the beam can be adjusted about one axis only.

An alternative arrangement to uniform distribution of hydrophones is to arrange the hydrophones in rings about the vertical axis, equally spaced in each ring as shown in FIG. 6.

An additional advantage of the brush contact and compensator arrangement shown in FIG. 5 wherein the delay line and signal summing circuitry are carried along with the compensator plate by one of the shafts for positioning the compensator is that the circuitry 34 and wiring connections therefor are minimized.

While the delay lines are shown in one block on the drawing, the invention contemplates either one delay line for each compensator conductor or a single delay line with inputs for each compensator conductor.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. Beam forming apparatus for a spherical array of hydrophones comprising:

a spherical array of radially inwardly directed wiper contacts, a compensator inside said spherical array of wiper contacts and including insulator means and a series of circular conducting elements having a common axis secured in said insulator means and presenting a smooth spherical surface sector with the conductor elements exposed at the spherical surface, for wiping engagement with the contacts, training means supporting said compensator concentrically within said array of wiper contacts and operable to arcuately displace said compensator about two axes through the center of said array of contacts, signal delay means and signal summing means carried by said training means inside said array of contacts and coupled to the conducting elements for delaying signals from the progressively smaller conductors by progressively longer time periods and for summing the variously delayed signals, and cooperating brush and slip ring means carried by said training means and said array of wiper contacts for delivering the output of said summing means.

2. An electrically steerable sonar equipment comprising:

a spherical array of approximately uniformly distributed hydrophones, a brush contact for each hydrophone in the array, means stationary relative to said array of hydrophones supporting said brush contacts about a common center with their contact faces directed radially inward and in the same angular relationship to one another as the respective hydrophones have to one another, signal coupling means joining respective contacts and hydrophones, a compensator including insulator means and a graduated series of circular conductors secured in spaced apart relation to said insulation means and together therewith defining a fraction of a hemispherical smooth convex surface sector with the circular conductors exposed at the surface, said conductors having a common axis, means supporting the compensator with its center coincident with the common center of said contacts an in engagement with some of said contacts and for displacing said compensator arcuately about said center and in wiping engagement with the contacts, and signal delay means and signal summing means supported inside said means supporting the contacts and movable with the compensator, and connected to said conductors for delaying signals from the progressively smaller conductors by progressively longer time periods and for summing the variously delayed signals.

* * * * *